Nov. 14, 1961 KENJIRO TAKAYANAGI ET AL 3,009,025

PULSE WIDTH RECORDING

Filed Dec. 20, 1957 4 Sheets-Sheet 1

Nov. 14, 1961 KENJIRO TAKAYANAGI ET AL 3,009,025.

PULSE WIDTH RECORDING

Filed Dec. 20, 1957 4 Sheets-Sheet 2

Nov. 14, 1961 KENJIRO TAKAYANAGI ET AL 3,009,025

PULSE WIDTH RECORDING

Filed Dec. 20, 1957 4 Sheets-Sheet 3

United States Patent Office 3,009,025

Patented Nov. 14, 1961

3,009,025
PULSE WIDTH RECORDING

Kenjiro Takayanagi, Tokyo, and Susumu Nomura, Yokohama, Japan, assignors to Victor Company of Japan, Limited, Yokohama, Japan Filed Dec. 20, 1957, Ser. No. 704,134
Claims priority, application Japan Mar. 16, 1957
6 Claims. (Cl. 179—100.2)

This invention relates to improvements in magnetic recording systems.

The principal object of this invention is to provide a magnetic recording system which has superior properties and is stable in operation and economical, and which enables recording with less distortion and larger amplitude than obtainable with heretofore known recording systems.

Another object of this invention is to reduce noise and to increase the ratio of *S/N* (signal to noise), and also to reduce deterioration due to external magnetic fields thereby resulting in stable and easy recording.

Figure 2:
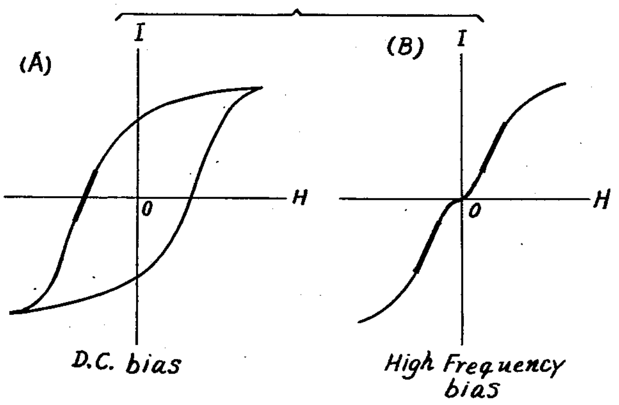

For a better understanding of this invention, reference is made to the accompanying drawing, in which:

FIGS. 1, 3A, 3B, 4A and 4B are diagrams illustrating the principle of the magnetic recording system of this invention;

FIGS. 2A and B are diagrams for explaining the principle of conventional magnetic recording systems;

FIGS. 5, 6A, 6B, 7A, 7B and 8–10 are diagrams for illustrating a magnetic recording system of this invention as applied to recording using rectangular wave signals;

FIGS. 11, 12, 13A, 13B, 14 and 15 are diagrams for illustrating another embodiment of this invention as applied to recording using saw-tooth or triangular wave signals; and FIGS. 16, 17A, 17B and 17C are diagrammatic views showing the relation between the gap of a recording head adapted for the system of this invention and a recorded body and also for explaining the manner of change of magnetization of the material for magnetizing a recorded body.

In conventional magnetic recording systems, there are employed a direct current bias system as shown in FIG. 2A and a high frequency bias system as shown in FIG. 2B, as well as improvements in these systems. In both of these systems, the intermediate straight line portions of the magnetization curve are used so that disadvantageously the maximum value of recorded residual magnetism not accompanying amplitude distortion is comparatively narrow and the ratio of signal to noise can never be sufficiently high even in a high frequency bias system which is accompanied by least noise. Moreover, since the degree of magnetization is weak, the record medium such as a tape is likely to be contaminated and deteriorated by stray fields. Further, since the shape of the magnetization curve is different for different magnetic material, selection of the optimum direct current or high frequency bias and the regulation of strength of the recording signals should be separately considered for each material in order to obtain optimum magnetization. Further as the intermediate straight line portion of the magnetization curve is used and there remains some contamination due to residual magnetism, unused tape should preferably be used for recording. Used or deteriorated tapes should not be used unless they have been perfectly erased. Thus, a D.C. or H.F. magnetic erasing device is required besides the recording head, which is a disadvantage.

According to the invention, the above disadvantages can be obviated and this invention relates to a magnetic recording system which is characterized in that a magnetic material is magnetized alternately in positive and negative directions with a suitable frequency higher than the frequency of the expected recording signal up to above the magnetically saturated condition, and the difference in widths of adjacent positive and negative magnetic saturation periods is changed in substantially direct proportion to the recording signal, thereby recording the desired signals to be recorded.

Figure 1:
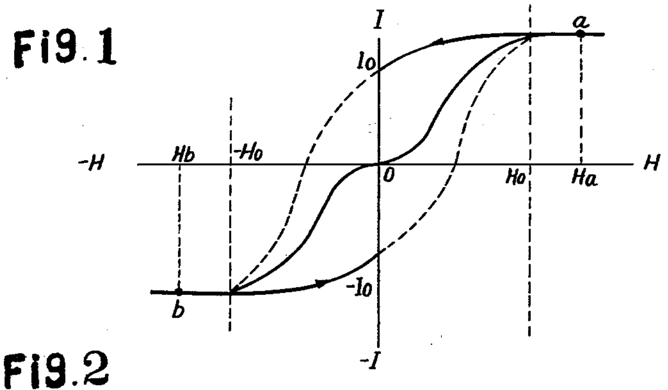

Referring to FIG. 1 showing a magnetization curve, according to this invention, a magnetic material is strongly magnetized to the strength at the points *a* and *b* alternately beyond the magnetic saturation point $H_0$ with a suitable frequency higher than the frequency of recording signal and the magnetic recording is maintained by the residual magnetism $I_0$ and $-I_0$.

Figure 3:
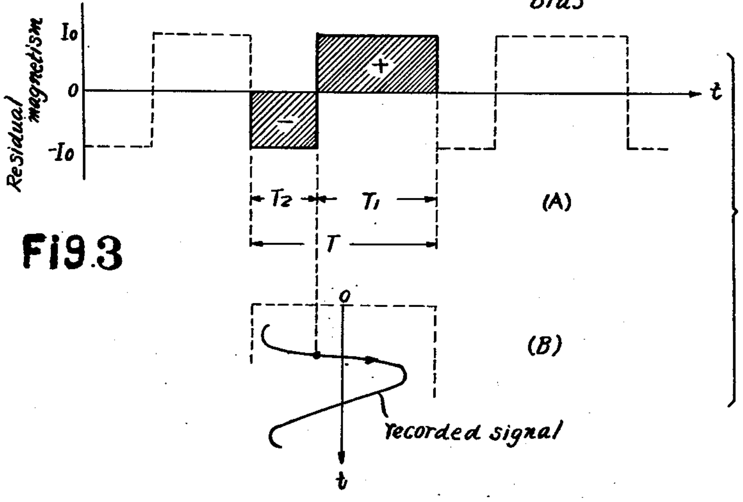
Figures 4, 5, 6, 7:
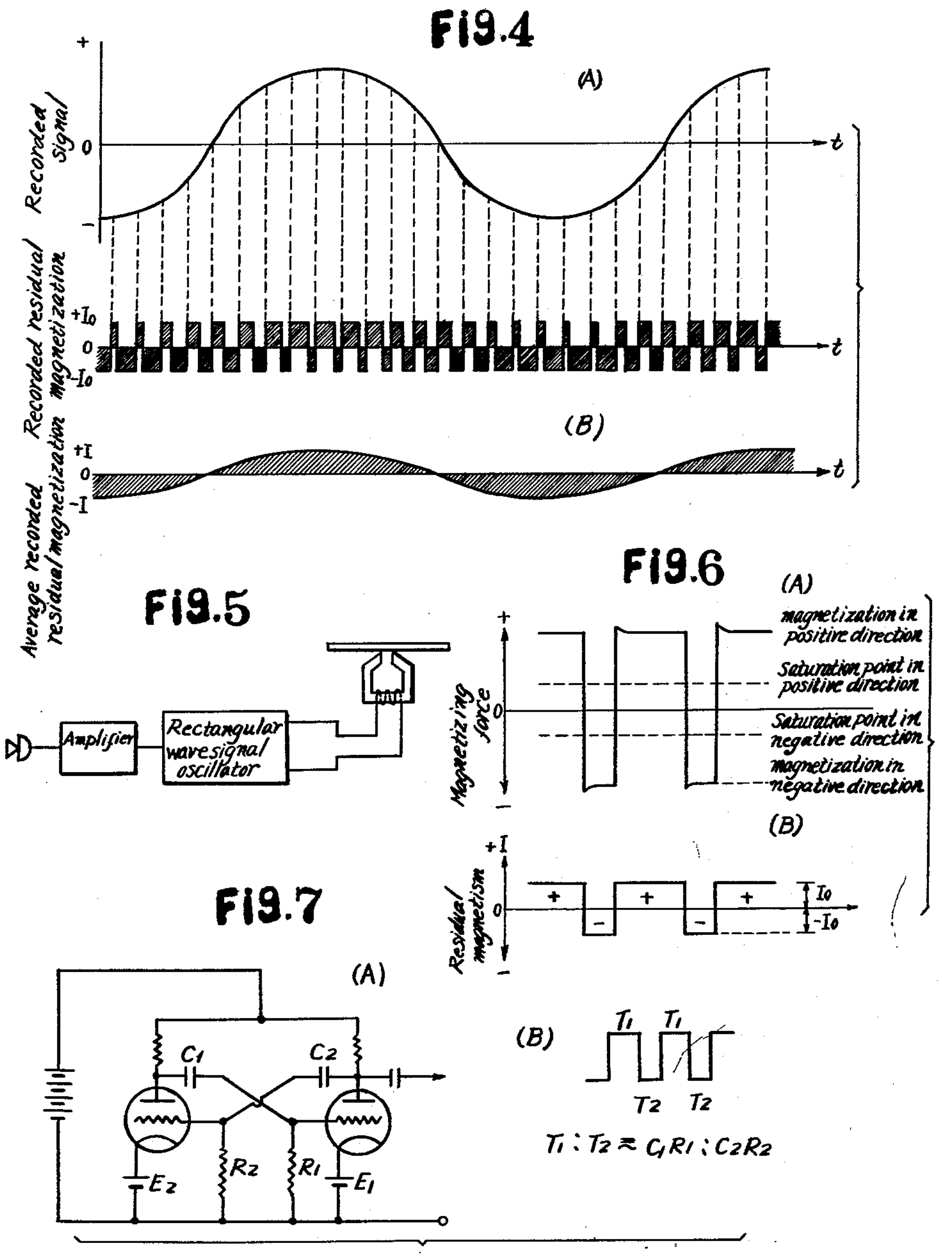

Referring to FIGS. 3 and 4, if the period of alternate magnetization be T, the pulse period of positive magnetization be $T_1$, and the pulse period of negative magnetization be $T_2$, the strength of magnetism recorded on the magnetic material, i.e. the magnetization period, will be proportional to $T_1$ for the positive magnetization and to $T_2$ for the negative magnetization. The average magnetization during the alternate magnetization period T is proportional to the difference between the positive and negative magnetization periods, that is, $T_1-T_2=\Delta T$. Accordingly if it is possible to change the difference $\Delta T$ in these two pulse periods $T_1$ and $T_2$, the signal recording can be effected by the maximum magnetization process. The present invention is based on the above principle.

The invention will be explained further in detail by several examples as shown in the drawing.

EXAMPLE I

*Recording by means of rectangular wave signals*

In this case, the effect of the invention can be attained by using a rectangular wave signal as shown in FIGS. 5 and 6A and B to modulate the pulse width corresponding to said signal and the rectangular wave signal thus obtained is applied to the magnetic recording head. In this case, it is necessary to maintain the strength of the pulse above the saturation point of the magnetic material used, but the wave form above the saturation point need not be of exact rectangular form. However, it is necessary that the magnetization should alternately attain the positive and negative saturation points and the difference in pulse widths during that period should vary proportionately to the wave form of the recording signal.

The rectangular wave signals can be generated by various methods. As example, a multi-vibrator circuit is shown in FIGS. 7A and B.

The ratio of periods $T_1$ and $T_2$ of the rectangular wave output is almost equal to the ratio of $C_1R_1$ and $C_2R_2$. The periods $T_1$ and $T_2$ can also be changed by varying the cathode voltages $E_1$ and $E_2$.

Figure 8:
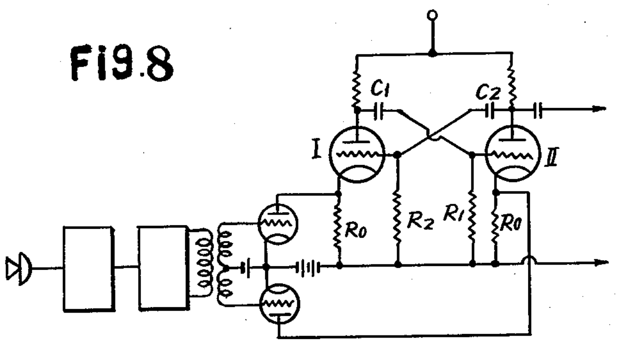

A push-pull modulation circuit is shown in FIG. 8.

It will be apparent without further explanation that if the signals having almost equal pulse periods $T_1$ and $T_2$ are generated and if the cathode voltages of the vacuum valves I and II are modulated by the recording signals to the reverse phase in push-pull system, then the difference between the periods $T_1$ and $T_2$ can be changed in proportion to the recording signals.

Moreover, the variation of pulse period (width) may be obtained by varying either one of the valves I and II. In this case, however, as the variation is only either $T_1$ or $T_2$ the variation of the difference of $T_1$ and $T_2$ will not only become one-half of that which will be obtained in case of push-pull modulation, but also it is a disadvantage that the variation of pulse width due to the signal modulation has non-linear characteristics. Thus the push-pull modulation shows better sensitivity and improved modulation characteristics.

It will be apparent that various other circuits can be devised besides those described above as means for generating rectangular wave signals by using a multi-vibrator and for varying the pulse widths.

Figure 9:
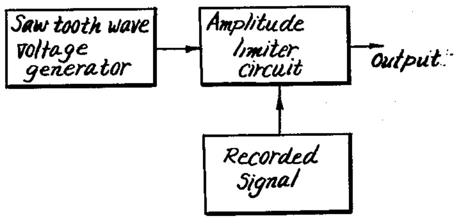

Besides the use of a multi-vibrator as a rectangular wave signal oscillators, there is a combination of a saw-tooth wave voltage generator and a circuit including an amplitude limiter, as shown in FIG. 9. In this case, a desired pulse width modulation can be obtained by properly applying the recording signals to the circuit of the amplitude limiter to modulate the limiting position.

Figure 10:
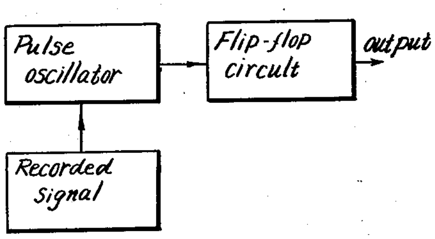

Further, the rectangular wave current can also be obtained by using a flip-flop circuit as shown in FIG. 10. In this case, the phasing of the pulse in the pulse oscillator can be varied to provide a desired pulse width of rectangular wave current.

EXAMPLE II

*Recording by saw-tooth wave or triangular wave signals*

In the foregoing, there has been explained recording, in which rectangular wave currents having different pulse widths $T_1$ and $T_2$ are generated and such currents are applied to a recording head. It is not always necessary to generate rectangular wave currents, since it is only necessary that magnetization up to the magnetic saturation point can be applied alternately as positive and negative pulses. Therefore, the wave form of the magnetizing current above magnetic saturation may be of any suitable form, since the residual magnetization can be made as rectangular wave form by limiting the magnetic saturation point automatically.

In order to produce difference of pulse widths $$T_1-T_2=\Delta T$$

corresponding to the recording signals in the above method, the saw-tooth or triangular signal current and the recording signal current may be applied to the recording head as an exciting current.

Figure 11:
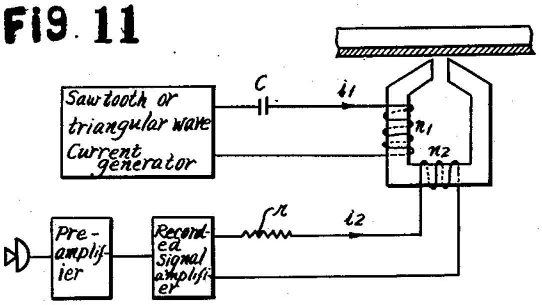

The principle of operation when the saw-tooth wave current is used in a device as shown in FIG. 11 is explained in the following:

The ampere-turns proportional to the magneto-motive force applied to the magnetizing circuit of the recording head may be expressed by $i_1n_1+i_2n_2$, wherein $i_1$ represents saw-tooth wave current, $n_1$ the number of coil turns, $i_2$ the recording current and $n_2$ the number of winding turns.

In FIGURE 11, separate winding turns $n_1$ and $n_2$ are used by inserting C and the resistance $r$ so as not to affect the relative characteristics of both circuits. It is not always necessary to use two separate coils, and any other method can be used which enables excitation by superposing two signals under favorable conditions without causing mutual interference.

Figure 12:
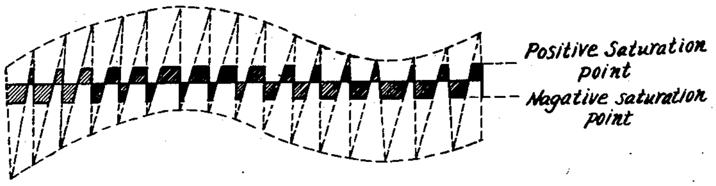

When the value of combined or total ampere turns lies always above the positive and negative magnetic saturation points the residual magnetic pulse of trapezoidal wave form having the modulated pulses as shown in FIG. 12 can be obtained. Since the positive and negative residual magnetisms caused by the excitation of the inclined portions of the trapezoid are cancelled by each other, this is actually equivalent to the rectangular wave pulse system.

Figures 13, 14, 15, 16, 17:
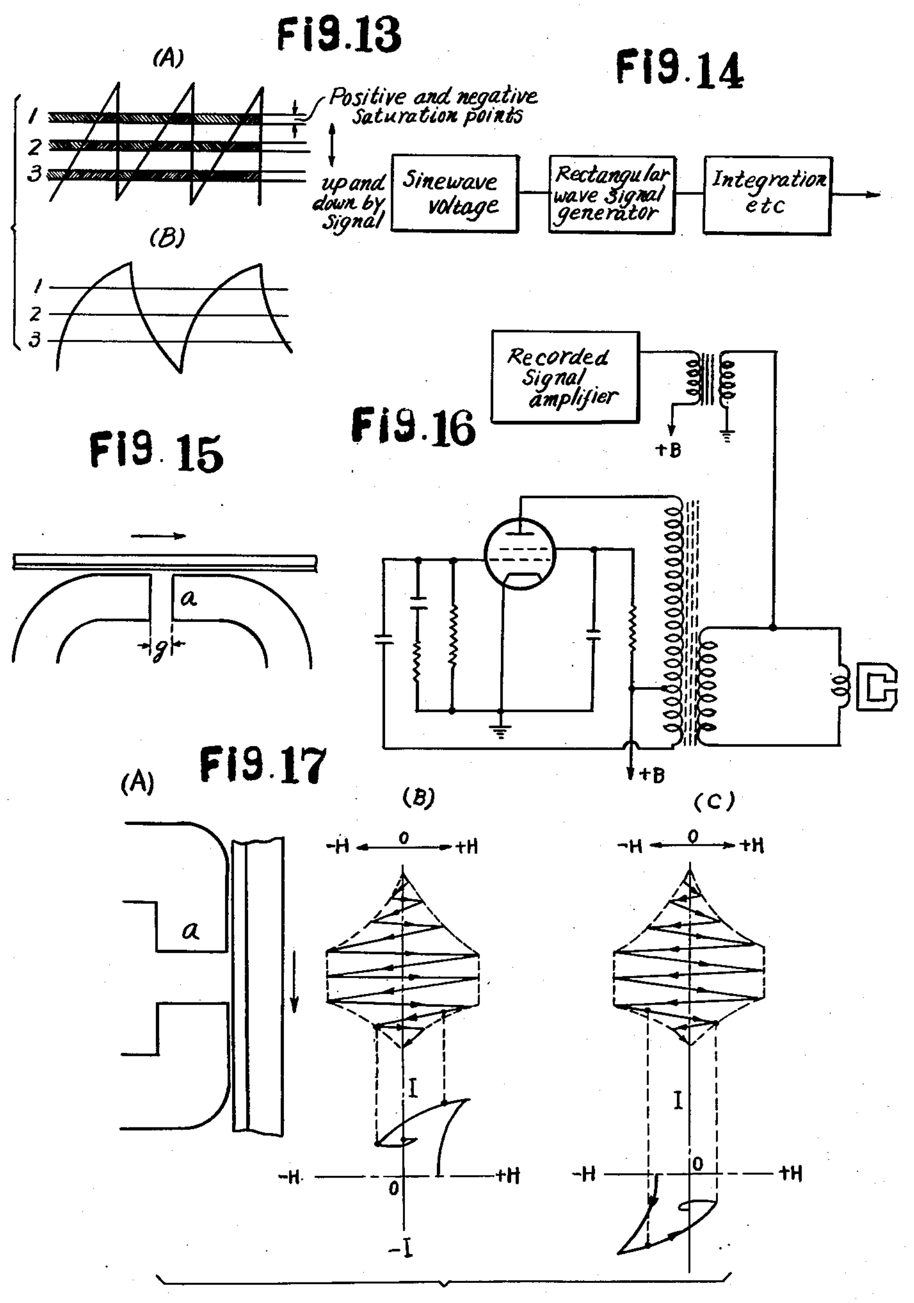

It will be apparent from FIGS. 13A and B that a desired pulse width modulation can be effected by varying the pulse width up and down corresponding to the variation of amplitude of recording signal as shown in FIG. 13. If the total excited ampere turns become large compared with the distance between the positive and negative saturation points, the wave form of the residual magnetism gradually approaches a rectangle. It is, however, not necessary in practice to go to such extremes.

Further, the saw-tooth wave current can as a practical matter be deformed to triangular wave form. If it approaches the triangular wave form, then the wave form may take a somewhat deformed shape such as an arc. In short, the saw-tooth current principle which can be used in this system of the invention is that the length of difference in cut-off pulse widths is substantially proportional to the recording signal current when the position of zero ampere-turns is changed by the recording signals.

There are various methods for generating triangular wave current, for instance, a triangular wave voltage is generated by the means shown in FIG. 14 and the rectangular wave voltage of $T_1 \approx T_2$ is produced by a wave form limiter and this voltage is applied to an integrating circuit or other suitable circuit.

In order to carry out the saw-tooth current system, a saw-tooth current generator using a single valve which is used for horizontal oscillation in the television art is shown in FIG. 15 and may be used for generating a saw-tooth current of higher frequencies than those of the recording signal, and this current is applied to the recording head.

As described above the present invention can be carried out in various manners. The advantages of the present system will now be explained in detail:

(1) Average recorded residual magnetization according to the system of this invention becomes maximum when the magnetization $T_1$ in positive direction becomes T, and $T_2=0$ so that the total surface is covered by the maximum magnetization $I_0$, while the magnetization in negative direction becomes minimum when $T_1=0$ and $T_2=T$, that is, the maximum variation of magnetization corresponding with $2I_0$. The range of variation of the average recorded residual magnetization is considerably broader than that obtainable by conventional recording systems and it can be said that it is the largest one which is theoretically obtainable.

(2) According to the present system, the noise signals can be maintained at a minimum since the positive and negative magnetization exist in close relation by making $T_1 \approx T_2$ when the amplitude of the recording signal is zero and the noises caused by the lack of homogeneity of the magnetic material in the direction of crystallization and size can be cancelled to a great extent so that the present device is almost equivalent to the high frequency bias system which was heretofore the most noiseless of the recording systems. Thus, the present system has the advantage that it is much better with respect to the ratio of signal to noise.

(3) According to the present system, the magnetization is strong so that it is less affected by deterioration due to the external magnetic fields or noise after recording.

(4) According to the present system, the device can be simplified since it is not necessary that the high frequency should be a constant frequency, or a sine wave, but it is only necessary that the difference of the positive and negative magnetization pulse periods be directly proportional to the recording signal.

(5) In the present system, the wave form and height of current applied to the recording head may take any suitable form above the magnetic saturation point, since it is only necessary to vary the difference of the positive and negative pulse widths of magnetic saturation in direct proportion to the recording signal. Thus, regulation and operation can be considerably simplified compared with conventional recording systems. Operation provided by the invention is also more stable.

Moreover, if the excitation at the magnetic saturation point is constant, the variation of the shape of the magnetizing curve is not important so that any change due to the magnetic material is less important than in conventional recording systems.

(6) The present system has the advantage that the recording head and the magnetic erase head can be combined together as a unit so that the device can be simplified and made economical.

Since in the present system the magnetization is effected in positive and negative directions alternately above the saturation point, the residual magnetism can be perfectly erased even though there remains residual magnetism in the previously recorded magnetic material.

(7) When the recorded body according to the present system is reproduced by means of an ordinary reproducing head, the magnetization of each pulse is averaged and the output due to magnetization of the value of its difference is taken out so that the output voltage can be taken out similarly to that in ordinary reproducing head.

(8) In order to carry out accurately the present system, it is preferable to make the gap *g* of the recording head as narrow as possible so that there is a minimum of leakage outside of the gap. However, even in the case the recording head has a wider gap and it takes several cycles for the magnetic material to pass by the gap, substantially the same recording effect can be brought about though the residual magnetism is somewhat less. In this case, it is desirable that the end *a* of the material of the magnetic head has a regular polygonal form and the tape and other magnetic recording body pass along its upper edge.

Under such a condition, though the gap is somewhat broad the magnetizing force of the tape or other magnetic recording body is reduced at the moment it passes through the gap so that the magnetic recording described above is possible. This condition is illustrated in FIGS. 17A, B and C. The change of magnetizing force to which the magnetic material is subjected when it passes through the gap of the recording head is caused in such manner that the material is strongly magnetized in positive and negative directions alternately and the magnetizing force attenuates from the instant when it passes through the gap. Nevertheless, a strong magnetism is retained corresponding to the positive and negative directions due to the positive and negative directions of the final magnetizing force. Further, a recording head having a broader gap has merit that the magnetic erasing can be effected perfectly.

Finally, the difference between the system of this invention and heretofore known high frequency bias systems will next be explained. The present system as described above utilizes positive and negative saturated magnetisms to effect magnetic recording by the difference of positive and negative pulse widths, while in the high frequency bias system sine wave current or somewhat similar high frequency current and the recording signal current are superposed for excitation and the straight line portions of the magnetic curve are taken for effecting positive and negative magnetizations alternately, and in this case the strength of magnetization is varied by the signal and the change of pulse widths is small. Accordingly, in the former the residual magnetism remains in almost direct proportion to the signal current, while in the latter high frequency bias system the inclination of the almost straight line portion of the magnetic properties is used, so that proportionality is different according to the degree of inclination. In the former, the values of positive and negative pulse currents are not critical, and it is all right if the current is above a certain value, while in the latter the optimum recording can never be obtained unless the value just coincides with the part of maximum inclination of magnetizing curve, so that the optimum value should be found in each tape.

What is claimed is:

1. Magnetic recording apparatus comprising a magnetic head, a magnetic record medium of magnetically saturable material, first means for applying a recording signal through said head to said medium, and second means for applying through said head to said medium a signal having a frequency higher than that of said recording signal and of a magnitude substantially greater than that necessary for saturating said head in both positive and negative magnetic directions, said means being operatively associated with each other to determine positive and negative magnetic saturation periods for saturating said record medium in proportion to the recording signal.

2. Apparatus as claimed in claim 1 wherein said second means is a rectangular wave generator.

3. Apparatus as claimed in claim 1 wherein said second means is a saw-tooth wave generator.

4. Apparatus as claimed in claim 1 wherein said second means generates triangular wave forms.

5. Apparatus as claimed in claim 1 comprising means for driving a record medium adjacent said head, said head defining an air gap adjacent said record medium, said air gap being of determinable dimension and said means driving said record medium by said gap at a speed related to said dimension and such that a given point on said record medium passes said gap within the time period of one cycle of a signal generated by said second means.

6. Apparatus as claimed in claim 1 comprising means for driving a record medium adjacent said head, said head defining an air gap adjacent said record medium, said air gap being of determinable dimension and said means driving said record medium by said gap at a speed related to said dimension and such that a given point on said record medium passes said gap within the time period of a plurality of cycles of a signal generated by said second means.

References Cited in the file of this patent

UNITED STATES PATENTS

| | | |
|---|---|---|
| 2,351,004 | Camras | June 13, 1944 |
| 2,681,387 | Roys | June 15, 1954 |
| 2,721,989 | Gates et al. | Oct. 25, 1955 |
| 2,822,533 | Duinker et al. | Feb. 4, 1958 |